(12) United States Patent  (10) Patent No.: US 7,447,787 B2
Choi et al.  (45) Date of Patent: Nov. 4, 2008

(54) PROTOCOL EXECUTING SYSTEM AND PROTOCOL PDU COMMON DATA STRUCTURE CONVERTING METHOD FOR PROCESSING PROTOCOL PDUS

(75) Inventors: Seung-Han Choi, Daejeon (KR); Tae-Gyu Kang, Daejeon (KR); Do-Young Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 949 days.

(21) Appl. No.: 10/637,873

(22) Filed: Aug. 8, 2003

(65) Prior Publication Data

US 2004/0114624 A1     Jun. 17, 2004

(30) Foreign Application Priority Data

Dec. 17, 2002   (KR)   .................. 10-2002-0080705

(51) Int. Cl.
 *G06F 15/16*   (2006.01)
(52) U.S. Cl. ........................... 709/230; 709/246
(58) Field of Classification Search ............. 709/230, 709/246, 247; 370/466
See application file for complete search history.

(56) References Cited

U.S. PATENT DOCUMENTS

| 5,263,137 A | | 11/1993 | Anezaki | |
|---|---|---|---|---|
| 5,418,963 A | * | 5/1995 | Anezaki et al. | 717/117 |
| 5,418,972 A | * | 5/1995 | Takeuchi et al. | 709/230 |
| 5,638,066 A | * | 6/1997 | Horiuchi et al. | 341/60 |
| 5,649,227 A | * | 7/1997 | Anezaki et al. | 712/1 |
| 5,778,360 A | * | 7/1998 | Sugita et al. | 707/4 |
| 5,790,812 A | * | 8/1998 | Frohmuller et al. | 710/105 |
| 5,870,749 A | * | 2/1999 | Adusumilli | 707/101 |
| 6,052,526 A | * | 4/2000 | Chatt | 717/136 |
| 6,154,156 A | * | 11/2000 | Tagato | 341/79 |
| 7,165,222 B1 | * | 1/2007 | Suzuki | 715/744 |
| 2003/0204638 A1 | * | 10/2003 | Murray | 709/310 |

OTHER PUBLICATIONS

Pimental et al., "Efficient encoding of application layer PDU's for fieldbus networks", ACM SIGCOMM Computer Communication Review, vol. 18, Issue 3 (May/Jun. 1988), pp. 14-44.*
A Study on the Development of MGCP and SDP Stack for VoIP Standard Protocols, pp. 3668-3674.

* cited by examiner

*Primary Examiner*—William C. Vaughn, Jr.
*Assistant Examiner*—Yemane Mesfin
(74) *Attorney, Agent, or Firm*—Blakely, Sokoloff, Taylor & Zafman

(57) ABSTRACT

Disclosed is a system and method for expandibly operating protocol PDU (Protocol Data Unit) encoding/decoding blocks communicating with a protocol executing block in the same protocol. With at least two types of protocol PDU encoding/decoding blocks for data communication in the same protocol, the protocol executing block does not implement the execution of protocol PDUs independently according to the respective encoding/decoding methods, but converts the information of the protocol PDU encoding/decoding block into that of the protocol executing block using a protocol PDU common data structure disposed between the protocol PDU encoding/decoding blocks and the protocol executing block.

5 Claims, 5 Drawing Sheets

```
struct request_convert_ExecutionToCommon
{
    int encoding_type;          — 510
    int structure_id;           — 511
    void *request_structure     — 512
};
```

FIG.6

```
struct request_convert_CommonToExecution
{
    int structure_id;
    void *request_structure
};
```

610 — int structure_id;
611 — void *request_structure

FIG.7

| Data structure identifier | Data structure conversion function |
|---|---|
| Identifier of protocol executing data structure A | A-A' data structure conversion function |
| Identifier of protocol PDU common data structure A' | A'-A data structure conversion function |
| ... | ... |

330A  330B  —330

PROTOCOL EXECUTING SYSTEM AND PROTOCOL PDU COMMON DATA STRUCTURE CONVERTING METHOD FOR PROCESSING PROTOCOL PDUS

CROSS REFERENCE TO RELATED APPLICATION

This application is based on Korea Patent Application No. 2002-80705 filed on Dec. 17, 2002 in the Korean Intellectual Property Office, the content of which is incorporated herein by reference.

BACKGROUND OF THE INVENTION (a) Field of the Invention

The present invention relates to a protocol executing system for processing protocol PDUs (Protocol Data Units). More specifically, the present invention relates to a method for executing protocols more flexibly and transparently according to the protocol PDU encoding/decoding method.

(b) Description of the Related Art

The encoding/decoding methods for generating protocol PDUs are classified into a binary-based method and a text-based method. The binary-based method, which method is encoding/decoding PDUs using binary values, reduces the size of the PDUs to allow a high performance with the use of small-sized memories but it is difficult to debug. The binary-based method is generally used as an encoding/decoding method for protocols that have complicated and long protocol grammar of the PDUs. On the other hand, the text-based method allows the users to immediately understand PDUs and has no debugging difficulty, making it possible to develop protocols in a short time. The text-based method, which disadvantageously takes a long decoding time for texts relative to the binary-based method, is used as an encoding/decoding method for protocols that have simple and short protocol grammar for PDUs.

The protocols currently in use have such a high adaptability that either the binary-based method or the text-based method can be selected according to the environment of the protocol-executing system. A specific example of the binary-based method includes Abstract Syntax Notation One (hereinafter referred to as "ASN.1"). The ASN.1, which describes an abstract syntax so as to implement an encoding/decoding method regardless of programming language, is disclosed in the standard by ITU-T. A specific example of the text-based method includes ABNF (Augmented Backus-Naur Form) suggested in the RFC2234 standard by IETF.

When a PDU data structure processed by a protocol executing block is subordinated between the ASN.1 encoding/decoding block and the protocol executing block, the subordinate addition of the ABNF-based encoding/decoding method may cause the following problems.

When the PDU data structure of the ABNF encoding/decoding block is set to the ASN.1 data structure, the PDU data structure is subordinate to the ASN.1 type. So, the ABNF protocol PDU encoding/decoding block has to be modified for processing the data structure whenever the ASN.1 protocol PDUs are changed.

Moreover, the load of the protocol executing block increases with different PDU data structures.

SUMMARY OF THE INVENTION

It is an advantage of the present invention to solve the problems with prior art and to enable a protocol executing block to efficiently process a PDU data structure.

In one aspect of the present invention, there is provided a protocol executing system that includes: a protocol PDU (Protocol Data Unit) sending block for sending at least two types of protocol PDUs; a plurality of protocol PDU encoding/decoding blocks for encoding/decoding protocol PDUs received/sent from/to the protocol PDU sending block; a protocol executing block for executing a protocol executing data structure; and a protocol PDU common data converting block disposed between the plural PDU encoding/decoding blocks and the protocol executing block, the protocol PDU common data converting block converting a decoded protocol PDU common data structure received from the plural protocol PDU encoding/decoding blocks into the protocol executing data structure, sending the converted protocol executing data structure to the protocol executing block, converting the protocol executing data structure received from the protocol executing block into the protocol PDU common data structure, and requesting the plural protocol PDU encoding/decoding blocks to encode the converted protocol PDU common data structure.

The protocol PDU common data converting block includes: a conversion table of protocol executing data structure and protocol PDU common data structure, the conversion table having conversion functions for a mutual conversion between the protocol executing data structure and the protocol PDU common data structure. The conversion table of protocol executing data structure and protocol PDU common data structure includes a first sequence having an arrangement of data structure identifiers, and a second sequence having an arrangement of conversion functions for converting the data structure based on a conversion type of the data structure according to the data structure identifier.

The protocol PDU common data converting block further includes a memory management unit for managing memories.

The protocol PDU common data converting block further includes: a first input unit for inputting information on the protocol executing data structure from the protocol executing block; a first conversion function searching unit for analyzing the input information, and searching for a conversion function for converting the protocol executing data structure into the protocol PDU common data structure from the conversion table of protocol executing data structure and protocol PDU common data structure; a first memory allocating unit for allocating a memory to the protocol PDU common data structure using the memory management unit, in the searched conversion function; a first copying unit for copying a value of the protocol executing data structure on the memory-allocated protocol PDU common data structure; and a first output unit for outputting the generated protocol PDU common data structure to the protocol PDU encoding/decoding blocks.

Also, the protocol PDU common data converting block further includes: a second input unit for inputting information on the protocol PDU common data structure from the protocol PDU encoding/decoding blocks; a second conversion function searching unit for analyzing the input information, and searching for a conversion function for converting the protocol PDU common data structure into the protocol executing data structure from the conversion table of protocol executing data structure and protocol PDU common data structure; a second memory allocating unit for allocating a memory to the protocol executing data structure using the memory management unit, in the searched conversion function; a second copying unit for copying a value of the protocol PDU common data structure on the memory-allocated protocol executing data structure; and a second output unit for outputting the generated protocol executing data structure to the protocol executing blocks.

The method for a mutual conversion of the protocol executing data structure and the protocol PDU common data structure includes the sequential operations of the detailed units of the protocol PDU common data structure converting block.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 6 shows a data structure fed into the protocol PDU common data structure converting block from a protocol PDU encoding/decoding block according to an embodiment of the present invention; and FIG. 7 shows a conversion table of protocol executing data structure to protocol PDU common data structure according to an embodiment of the present invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
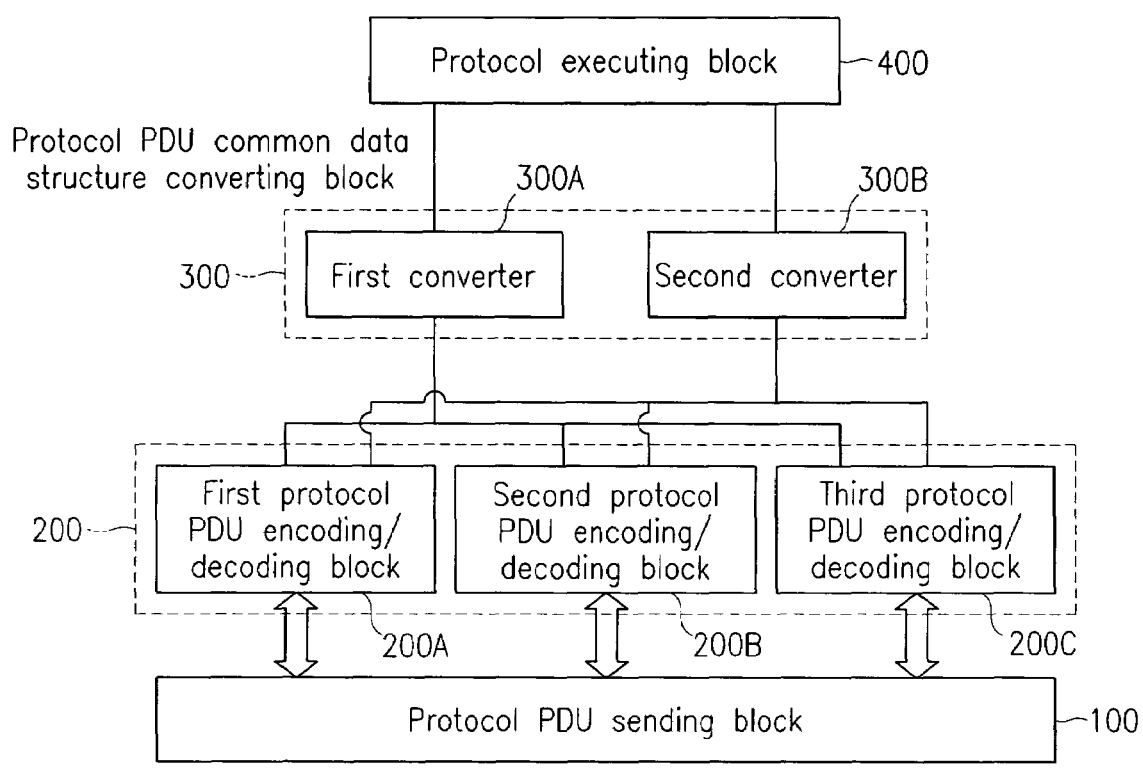
FIG. 1 is a block diagram showing the structure of a protocol executing block and the position of a protocol PDU common data structure converting block according to an embodiment of the present invention.

FIG. 1 shows a protocol executing system including a protocol PDU common data structure converting block according to an embodiment of the present invention.

The protocol executing system according to the embodiment of the present invention comprises, as shown in FIG. 1, a protocol PDU sending block 100, a plurality of protocol PDU encoding/decoding blocks 200, a protocol PDU common data structure converting block 300, and a protocol executing block 400.

Each of the protocol PDU encoding/decoding blocks 200 comprises a first protocol PDU encoding/decoding section 200A for encoding/decoding protocol PDUs of the ABNF format, a second protocol PDU encoding/decoding section 200B for encoding/decoding protocol PDUs of the ASN.1 format, and a third protocol PDU encoding/decoding section 200C for encoding/decoding protocol PDUs of other formats.

The protocol PDU common data structure converting block 300 comprises a first converter 300A for converting a protocol executing data structure to a protocol PDU common data structure, and a second converter 300B for converting a protocol PDU common data structure to a protocol executing data structure.

Next, the operation of each block shown in FIG. 1 will be described.

When the protocol PDU encoding/decoding block receives a protocol PDU from the protocol PDU sending block 100, the moving path of the protocol PDU is determined according to the protocol encoding/decoding type of the protocol PDU. If the protocol PDU type is ABNF, the protocol PDU is sent to the first protocol PDU encoding/decoding block 200A; if the protocol PDU type is ASN.1, the protocol PDU is sent to the second protocol PDU encoding/decoding block 200B; or if the protocol PDU type is other than ABNF or ASN.1, the protocol PDU is sent to the third protocol PDU encoding/decoding block 200C. The protocol PDU is decoded at the corresponding encoding/decoding block to produce a protocol PDU common data structure, which is sent to the protocol PDU common data structure converting block 300 and converted to a protocol executing data structure. Finally, the protocol executing data structure is sent to the protocol executing block 400 to execute the protocol.

Figure 2:
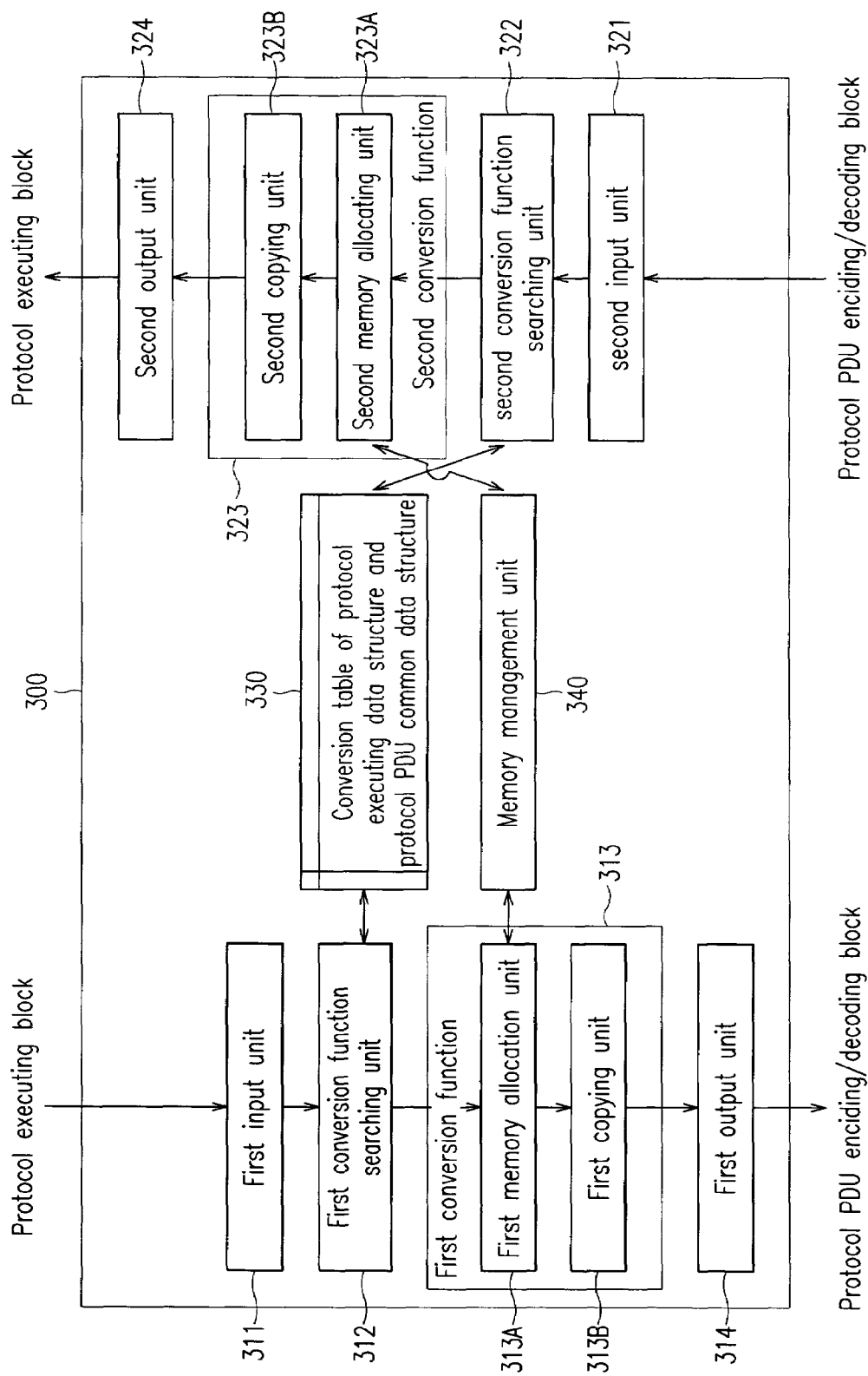
FIG. 2 is a block diagram of the detailed units of the protocol PDU common data structure converting block according to an embodiment of the present invention.

FIG. 2 shows the detailed units in the protocol PDU common data structure converting block 300 shown in FIG. 1 by functions.

The detailed units include units 311 to 314 used for conversion of the protocol executing data structure into the protocol PDU common data structure; units 321 to 324 used for conversion of the protocol PDU common data structure into the protocol executing data structure; a conversion table 300 of protocol executing data structure to protocol PDU common data structure; and a memory management unit 340.

Next, a description will be given as to the operation of the detailed units shown in FIG. 2 according to the conversion type of the protocol data structure.

Figures 4, 5:
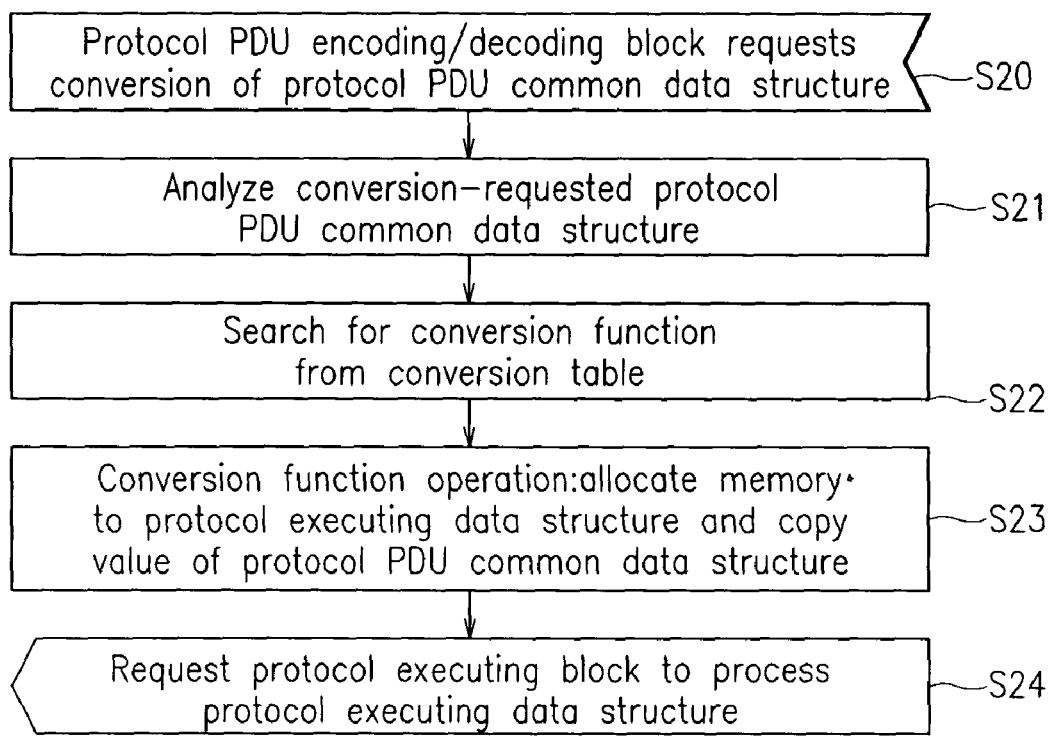
FIG. 4 is a flow chart showing the process of converting a protocol executing data structure to a protocol PDU common data structure according to an embodiment of the present invention.
FIG. 5 shows a data structure fed into the protocol PDU common data structure converting block from the protocol executing block according to an embodiment of the present invention.

For conversion of the protocol executing data structure into the protocol PDU common data structure, the protocol executing block 400 sends a request for conversion of the protocol executing data structure to the first input processing unit 311. The conversion-requested information from the protocol executing block 400 is shown in FIG. 5. A first conversion function searching unit 411 analyzes the information conversion-requested by the protocol executing block 400, and searches for a conversion function for converting the protocol executing data structure into the protocol PDU common data structure using the protocol executing data structure as a key value from the conversion table 300 of protocol executing data structure to protocol PDU common data structure. A first conversion function operator 313 comprises two units 313A and 313B: the first memory allocating unit 313A is allocated with memories for the protocol PDU common data structure using the memory management unit 340; and the first copying unit 313B copies the value of the protocol executing data structure on the memory-allocated protocol PDU common data structure. A first output unit 314 outputs the generated protocol PDU common data structure to the selected protocol PDU encoding/decoding block.

For conversion of the protocol PDU common data structure into the protocol executing data structure, the protocol PDU encoding/decoding block 200 sends a request for conversion of the protocol PDU common data structure to the second input processing unit 321. The conversion-requested information from the protocol PDU encoding/decoding block 200 is shown in FIG. 6. A second conversion function searching unit 322 analyzes the information conversion-requested by the protocol PDU encoding/decoding block 200, and searches for a conversion function for converting the protocol PDU common data structure into the protocol executing data structure using the protocol PDU common data structure as a key value from the conversion table 330 of protocol PDU common data structure to protocol executing data structure. A second conversion function operator 323 comprises two units 323A and 323B: the second memory allocating unit 323A is allocated with memories for the protocol executing data structure using the memory management unit 340; and the second copying unit 323B copies the value of the protocol PDU common data structure on the memory-allocated protocol executing data structure. A second output unit 324 outputs the generated protocol executing data structure to the protocol executing block 400.

Figure 3:
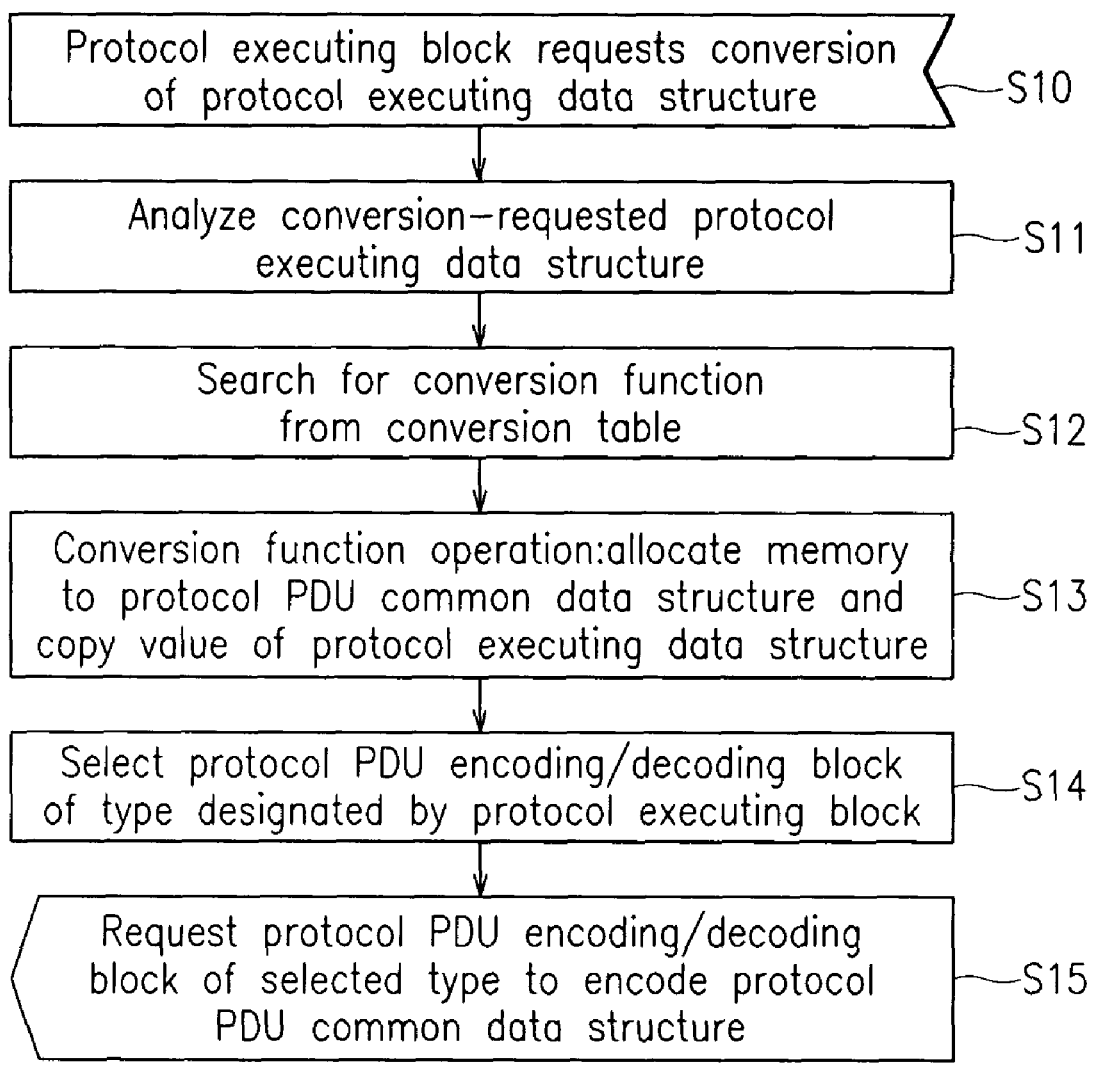
FIG. 3 is a flow chart showing the process of converting a protocol PDU common data structure to a protocol executing data structure according to an embodiment of the present invention.

FIG. 3 is a flow chart showing the process for converting the protocol executing data structure into the protocol PDU common data structure according to an embodiment of the present invention. The sequential steps of the conversion flow chart are given as follows.

The protocol executing block sends a request for conversion of the protocol executing data structure (in step S10). The conversion-requested protocol executing data structure is then analyzed (in step S11). A conversion function for converting the analyzed protocol executing data structure into the protocol PDU common data structure is searched from the conversion table of protocol executing data structure to protocol PDU common data structure (in step S12). The memories for the protocol PDU common data structure in the conversion function is allocated, and then the value of the protocol executing data structure is copied on the memory-allocated protocol PDU common data structure (in step S13). The protocol PDU encoding/decoding block of the type designated by the protocol executing block is selected (in step S14). Finally, the selected protocol PDU encoding/decoding block can be requested to encode the protocol PDU common data structure (in step S15).

FIG. 4 is a flow chart showing the process for converting the protocol PDU common data structure into the protocol executing data structure according to an embodiment of the present invention. The sequential steps of the conversion flow chart are given as follows.

The protocol PDU encoding/decoding block sends a request for conversion of the protocol PDU common data structure (in step S20). The conversion-requested protocol PDU common data structure is then analyzed (in step S21). A conversion function for converting the analyzed protocol PDU common data structure into the protocol executing data structure is searched from the conversion table of protocol PDU common data structure to protocol executing data structure (in step S22). The memories for the protocol executing data structure in the conversion function is allocated, and then the value of the protocol PDU common data structure is copied on the memory-allocated protocol executing data structure (in step S23). Finally, the protocol executing block can be requested to process the protocol executing data structure (in step S24).

FIG. 5 shows an example of the data structure fed into the first input unit 311 in the protocol PDU common data structure converting block 300 when the protocol executing block requests conversion of the protocol executing data structure into the protocol PDU common data structure. The data structure comprises: a data structure component 510 representing the protocol PDU encoding/decoding type; a data structure component 511 representing the type of conversion-requested protocol executing data structure; and a data structure component 512 representing the value of the conversion-requested protocol executing data structure.

FIG. 6 shows an example of the data structure fed into the second input unit 321 in the protocol PDU common data structure converting block 300 when the protocol PDU encoding/decoding block requests conversion of the protocol PDU common data structure into the protocol executing data structure. The data structure comprises: a data structure component 610 representing the type of the conversion-requested protocol PDU common data structure; and a data structure component 611 representing the value of the conversion-requested protocol PDU common data structure.

FIG. 7 shows the configuration of the conversion table 330 of protocol executing data structure to protocol PDU common data structure. The conversion table 330 comprises first and second sequences: the first sequence 330A includes an arrangement of data structure identifiers; and the second sequence 330B includes an arrangement of data structure conversion functions.

Next, a description will be given as to a process for searching for a conversion function using the conversion table in regard to the detailed units of the protocol PDU common data structure converting block.

The first searching unit 312 in the protocol PDU common data structure converting block 300 searches for a conversion function for converting the protocol executing data structure into the protocol PDU common data structure using the protocol executing data structure identifier 511. Likewise, the second searching unit 322 in the protocol PDU common data structure converting block 300 searches for a conversion function for converting the protocol PDU common data structure into the protocol executing data structure using the protocol PDU common data structure identifier 610.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention suggests a method for converting the protocol PDU common data structure in the protocol executing system and acquires the following advantages. With at least two types of protocol PDU encoding/decoding blocks for data communication in the same protocol, the protocol executing block does not implement the execution of protocol PDUs independently according to the respective encoding/decoding methods, but converts the information of the protocol PDU encoding/decoding block into that of the protocol executing block using a protocol PDU common data structure disposed between the protocol PDU encoding/decoding block and the protocol executing block. Accordingly, with an additional protocol PDU encoding/decoding block of another type, the present invention provides expansibility to execute the whole protocol function without correcting the protocol executing block.

What is claimed is:

1. A data structure converting method, which is for converting a protocol executing data structure into a protocol PDU common data structure, the method comprising:

(a) a protocol executing block requesting conversion of the protocol executing data structure;

(b) analyzing the conversion-requested protocol executing data structure;
(c) searching for a conversion function for converting the analyzed protocol executing data structure into the protocol PDU common data structure, using a conversion table of protocol executing data structure and protocol PDU common data structure;
(d) allocating a memory to the protocol PDU common data structure in the searched conversion function, and copying a value of the protocol executing data structure on the memory-allocated protocol PDU common data structure to operate the conversion function; and
(e) selecting a protocol PDU encoding/decoding block of a type designated by the protocol executing block, and requesting the protocol PDU encoding/decoding block of the selected type to encode the protocol PDU common data structure, wherein the protocol PDU encoding/decoding block is among a plurality of protocol PDU encoding/decoding blocks including a first protocol PDU encoding/decoding block of an augmented Backus-Naur format, a second protocol PDU encoding/decoding block of an Abstract Syntax Notation One format, the protocol PDU common data converting block including:
   a second conversion function searching unit for analyzing input information on the protocol PDU common data structure from the protocol PDU encoding/decoding blocks, and searching for a conversion function for converting the protocol PDU common data structure into the protocol executing data structure from the conversion table of protocol executing data structure and protocol PDU common data structure,
   a second memory allocating unit for allocating a memory to the protocol executing data structure, in the searched conversion function,
   a second copying unit for copying a value of the protocol PDU common data structure on the memory-allocated protocol executing data structure.

2. The data structure converting method as claimed in claim 1, wherein the data structure input from the protocol executing block comprises a requested encoding type, an identifier of the protocol executing data structure, and a value of the protocol executing data structure.

3. A data structure converting method, which is for converting a protocol PDU common data structure into a protocol executing data structure, the method comprising:
(a) a protocol PDU encoding/decoding block requesting conversion of the protocol PDU common data structure, wherein the protocol PDU encoding/decoding block is among a plurality of protocol PDU encoding/decoding blocks including a first protocol PDU encoding/decoding block of an augmented Backus-Naur format, a second protocol PDU encoding/decoding block of an Abstract Syntax Notation One format, the protocol PDU common data converting block including:
   a second conversion function searching unit for analyzing input information on the protocol PDU common data structure from the protocol PDU encoding/decoding blocks, and searching for a conversion function for converting the protocol PDU common data structure into the protocol executing data structure from the conversion table of protocol executing data structure and protocol PDU common data structure,
   a second memory allocating unit for allocating a memory to the protocol executing data structure, in the searched conversion function,
   a second copying unit for copying a value of the protocol PDU common data structure on the memory-allocated protocol executing data structure;
(b) analyzing the conversion-requested protocol PDU common data structure;
(c) searching for a conversion function for converting the analyzed protocol PDU common data structure into the protocol executing data structure, using a conversion table of protocol executing data structure and protocol PDU common data structure;
(d) allocating a memory to the protocol executing data structure in the searched conversion function, and copying a value of the protocol PDU common data structure on the memory-allocated protocol executing data structure to operate the conversion function; and
(e) requesting the protocol executing block to process the protocol executing data structure.

4. The data structure converting method as claimed in claim 3, wherein the data structure input from the protocol PDU encoding/decoding block comprises an identifier of the protocol PDU common data structure, and a value of the protocol PDU common data structure.

5. The data structure converting method as claimed in claim 1, wherein the conversion table of protocol executing data structure and protocol PDU common data structure comprises a first sequence having an arrangement of data structure identifiers, and a second sequence having an arrangement of conversion functions for converting the data structure based on a conversion type of the data structure corresponding to the data structure identifier.

* * * * *